US008640740B2

(12) United States Patent
Herbst

(10) Patent No.: US 8,640,740 B2
(45) Date of Patent: Feb. 4, 2014

(54) EMBEDDED METALLIC TUBES WITH COMPRESSION FIT AND METHOD FOR MANUFACTURING THE SAME

(75) Inventor: Brian Herbst, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 1092 days.

(21) Appl. No.: 11/911,784

(22) PCT Filed: Aug. 1, 2006

(86) PCT No.: PCT/US2006/030128
§ 371 (c)(1),
(2), (4) Date: Oct. 8, 2009

(87) PCT Pub. No.: WO2008/016353
PCT Pub. Date: Feb. 7, 2008

(65) Prior Publication Data
US 2010/0012217 A1    Jan. 21, 2010

(51) Int. Cl.
*F16L 9/14* (2006.01)
(52) U.S. Cl.
USPC ............................. 138/143; 138/151; 138/171
(58) Field of Classification Search
USPC ......................................... 138/143, 151, 171
See application file for complete search history.

(56) References Cited

U.S. PATENT DOCUMENTS

| 621,730 | A | | 3/1899 | Wilmot |
|---|---|---|---|---|
| 2,072,273 | A | * | 3/1937 | Obert ............................ 138/151 |
| 2,311,138 | A | * | 2/1943 | Swartz ........................... 138/151 |
| 3,598,156 | A | * | 8/1971 | Ulmer et al. ................... 138/143 |
| 3,863,328 | A | | 2/1975 | Arntz |
| 4,558,721 | A | | 12/1985 | Trudell et al. |
| 4,747,225 | A | * | 5/1988 | Gstettner et al. .............. 42/76.02 |
| 4,759,487 | A | | 7/1988 | Karlinski |
| 4,823,847 | A | | 4/1989 | Grosse et al. |
| 5,170,557 | A | | 12/1992 | Rigsby |
| 5,730,189 | A | * | 3/1998 | Randlett et al. ................ 138/171 |
| 5,836,065 | A | | 11/1998 | Dehlinger et al. |
| 6,579,628 | B2 | * | 6/2003 | Takeuchi et al. .............. 428/667 |
| 6,659,137 | B2 | * | 12/2003 | Imasaki et al. ................. 138/142 |

FOREIGN PATENT DOCUMENTS

| DE | 732527 | | 3/1943 |
|---|---|---|---|
| FR | 2721374 | A1 | 12/1995 |
| GB | 930214 | | 7/1963 |

OTHER PUBLICATIONS

Canadian Office Action dated Aug. 7, 2012 issued in CA Patent Application No. 2,658,125.

* cited by examiner

*Primary Examiner* — James Hook
(74) *Attorney, Agent, or Firm* — Sughrue Mion, PLLC

(57) ABSTRACT

A metallic tube, including a first cylindrical member, which is formed from a flat metal strip, and a second cylindrical member, which is formed from a flat metal strip, wherein the first cylindrical member is embedded within the second cylindrical member.

17 Claims, 6 Drawing Sheets

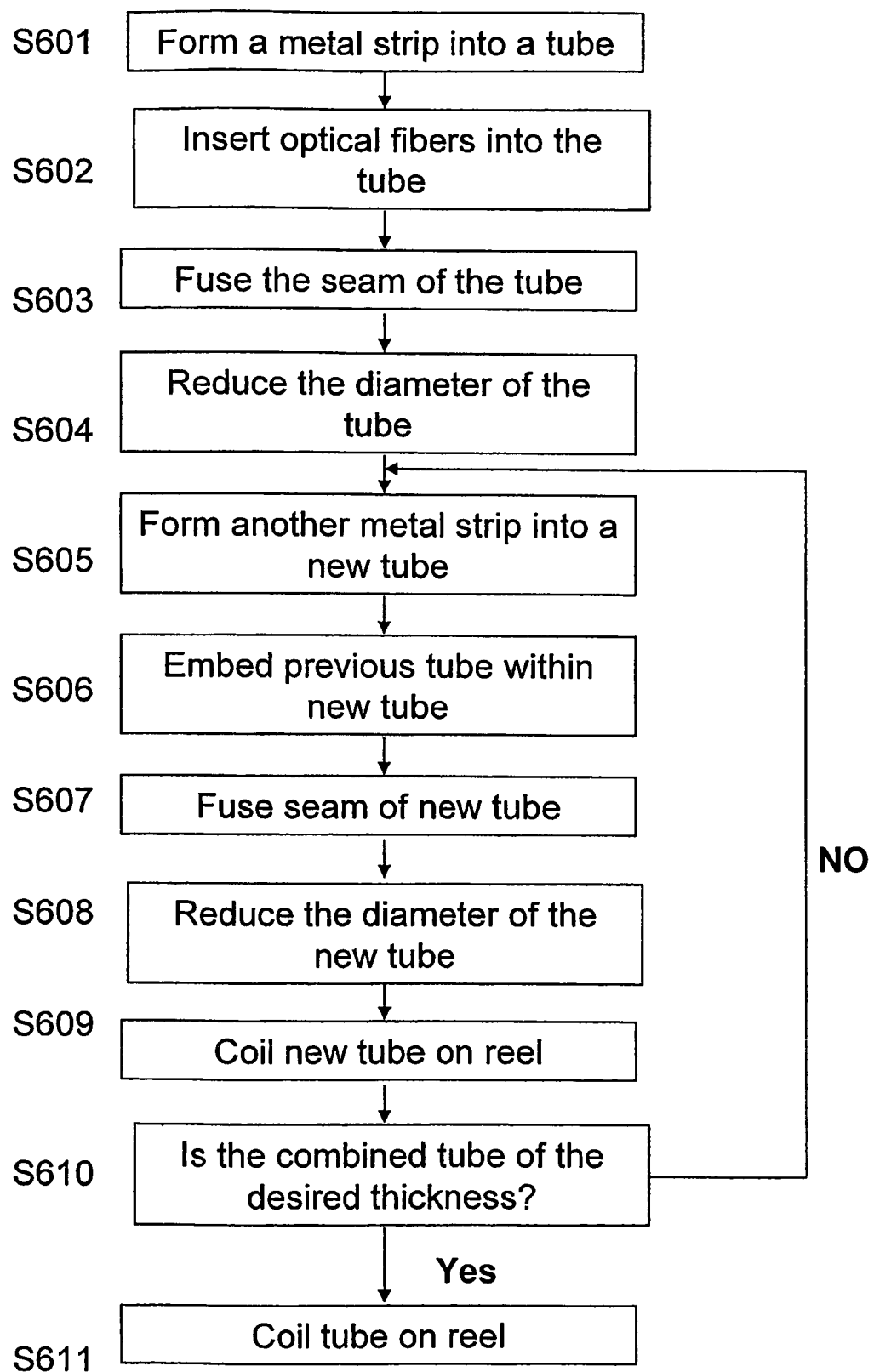

EMBEDDED METALLIC TUBES WITH COMPRESSION FIT AND METHOD FOR MANUFACTURING THE SAME

BACKGROUND OF THE INVENTION

1. Field of the Invention

The present invention relates to small diameter metal tubing. More specifically, the present invention relates to creating a metal tube product that has a wall thickness that is substantially increased over conventional single tube manufacturing capabilities, as well as the method of manufacturing the metal tubing.

2. Description of the Related Art

Metal tubing is important in many industrial applications such as a protective shield for optical fibers and coated copper conductors. Tubing typically is measured by outer diameter and wall thickness. Manufacturing the tubing to high wall thicknesses to withstand crush or tensile forces is difficult because forming and welding metal above a certain wall thickness can cause excessive wear to the manufacturing machine and dramatically reduce the speed at which the tubing machine may operate.

On mills that use a laser welding process, for example, the ability to weld, maintain a speed that is an acceptable rate and draw or roll reduce is limited by the thickness of the metal. To double the wall thickness on a laser welding tube machine from 0.008 inches to 0.016 inches will reduce the speed dramatically and create significant wear and tear on the machine as the machine may not be optimally designed for this thickness of metal.

U.S. Pat. No. 4,759,487, hereby incorporated in its entirety by reference, discloses an apparatus and method for continuously manufacturing optical fiber cable in which the optical fibers are encased in a sealed metal tube formed from a flat metal strip as seen in FIGS. 1 and 2. The apparatus 10 creates a partially formed tube 12 from a steel strip 11 by passing the steel strip 11 through a first roller assembly 24. Optical fibers 13 are placed within the partially formed tube 12. The apparatus then closes the tube by a second roller assembly 65, and a welding laser 74 seals the tube. The sealed tube is then pulled through wire dies 95 by wheel 98 to reduce the diameter of the sealed tube as seen in FIG. 2.

FIG. 3 shows a plan view of a metal tube 300 created by the above process. As can be seen the tube includes a single wall 310.

As the diameter of a tube goes down and the wall thickness increases, the ability to form the metal strip to a round shape becomes increasingly difficult. In addition, if the tube is to be drawn or roll reduced down to a smaller size, the tube itself may be unable to withstand the forces of drawing or roll reduction. The equipment also may not be suitable to accomplish the task thus requiring a re-design of the equipment or completely new equipment.

Further, metal tubing created by the process has the potential for un-detected minor flaws in the weld area. These minor flaws, under adverse conditions such as pressure or corrosive materials can result in a product failure.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Apparatuses and methods consistent with the present invention relate to creating a metal tube product with an increased wall thickness over conventional methods, and methods for creating such a tube product.

According to an aspect of the present invention, there is provided a metal tubing including, a first cylindrical member that is formed from a first flat metal strip, and a second cylindrical member that is formed from a second flat metal strip. The second metal cylindrical member is formed so as to embed the first cylindrical member within the second cylindrical member.

According to another aspect of the present invention, the inner diameter of the second cylindrical member creates a compression fit with the first cylindrical member.

According to another aspect of the present invention, the thickness of the first cylindrical member is substantially similar to the thickness of the second cylindrical member.

According to another aspect of the present invention, the thickness of the first cylindrical member is different than the thickness of the second cylindrical member.

According to another aspect of the present invention, the thickness of the first cylindrical member and the second cylindrical member are made from different metals.

According to another aspect of the present invention, the first cylindrical member and the second cylindrical member are made from the same metal.

According to another aspect of the present invention, a method for creating a metal tube includes, forming a first cylindrical member from a first flat metal strip, forming a second cylindrical member from a second flat metal strip, and embedding the first cylindrical member within the second cylindrical member, so that the second cylindrical member is compression fit to the first cylindrical member.

According to another aspect of the present invention, a method for creating a metallic tube product includes creating a plurality of cylindrical members having different diameters from a plurality of flat metal strips, and creating a layered metal tube by embedding the plurality the cylindrical members within each other in order from smallest to largest, wherein the embedded cylindrical members are compression fit. The limit to the number of cylindrical members used being limited only by the physical constraints of the specific machine being used.

According to another aspect of the present invention, at least two of the plurality of cylindrical members are composed of different metals; and at least two of the plurality of flat metal strips have different thicknesses.

According to another aspect of the present invention, each of the plurality of cylindrical members are composed of the same metal.

According to another aspect of the present invention, the plurality of flat metal strips have a substantially similar thickness.

BRIEF DESCRIPTION OF THE DRAWINGS

The above and other aspects of the present invention will become apparent and more readily appreciated from the following description of the exemplary embodiments, taken in conjunction with the accompanying drawings of which:

FIG. 6 is a flowchart of an operation of creating a metal tube according to an exemplary embodiment of the present invention.

DETAILED DESCRIPTION OF THE EXEMPLARY EMBODIMENTS

In an exemplary embodiment of the present invention, a multi-layered metal tubing is created.

Figure 4:
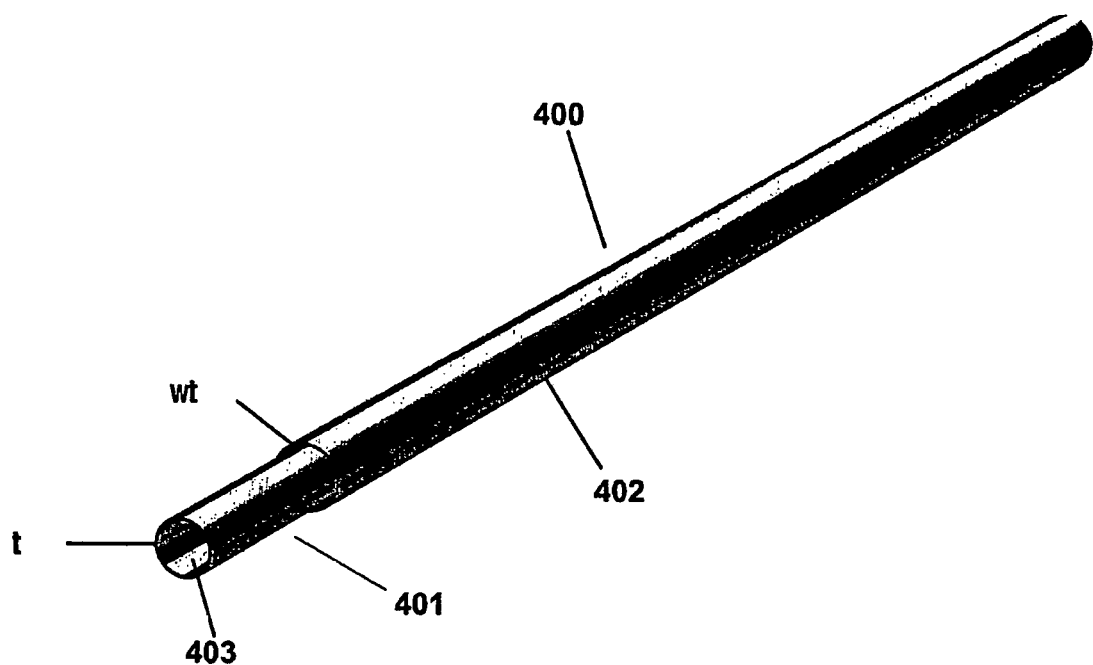
FIG. 4 is a plan view of a two-layered metal tubing according to an exemplary embodiment of the present invention.

FIG. 4 is a plan view of a multi-layered metal tubing 400 with a portion of the outside tube removed to show the layering of the tubing. The metal tubing includes a first tube 401 containing optical fibers 403, and a second tube 402, wherein the inner diameter of the second tube 402 is in intimate contact with the outer diameter of the first tube 401.

The first tube 401 may be composed of, but is not limited to aluminum, stainless steel, copper, nickel based alloys, etc. In the current exemplary embodiment, the first tube 1 has wall thickness t of 0.008 in.

The second tube 402 may also be composed the same metals as first tube 401, or the second tube 402 may be composed of a different metal than the first tube 401. In the current exemplary embodiment, the second tube 402 also has a wall thickness wt of 0.008 in. The combined wall thickness of the tubes is 0.016 in. The wall thickness of the second tube 402 does not need be the same as the first tube 401. The wall thickness wt of the second tube 402 may be larger than the wall thickness t of the first tube 401, or the wall thickness wt of the second tube 402 may be smaller than the wall thickness t of the first tube 401.

The effect of the combined tubing in the present exemplary embodiment is that the finished product performs as though it is a single-walled tube with a wall thickness of 0.016 in. Additional tubes can be added and is only limited by the capability of the machine. A thickness of 0.032 in has been achieved on diameters less than ⅛ inch. This wall thickness has been previously unattainable for laser welded metal tubing with a diameter of less than ¼ in.

The wall thickness of the different layers depends on the types of materials and the existing manufacturing process. For example, on lines that weld stainless steel using a laser, typical wall thicknesses vary from 0.004" to 0.013" although smaller and larger have been accomplished. If the need is for an 0.018" wall thickness, the present invention could make an initial tube of 0.008" thickness followed by a thickness of 0.010". On equipment used to make aluminum tube, the wall thicknesses may be much larger. For one particular market, one of the typical products will have wall thicknesses ranging from 0.020" to 0.100". The same concept as in laser welded tubes can be applied. Given the range of materials and process capabilities, one skilled in the art can determine what size of tubing the equipment is capable of producing.

Figure 5:
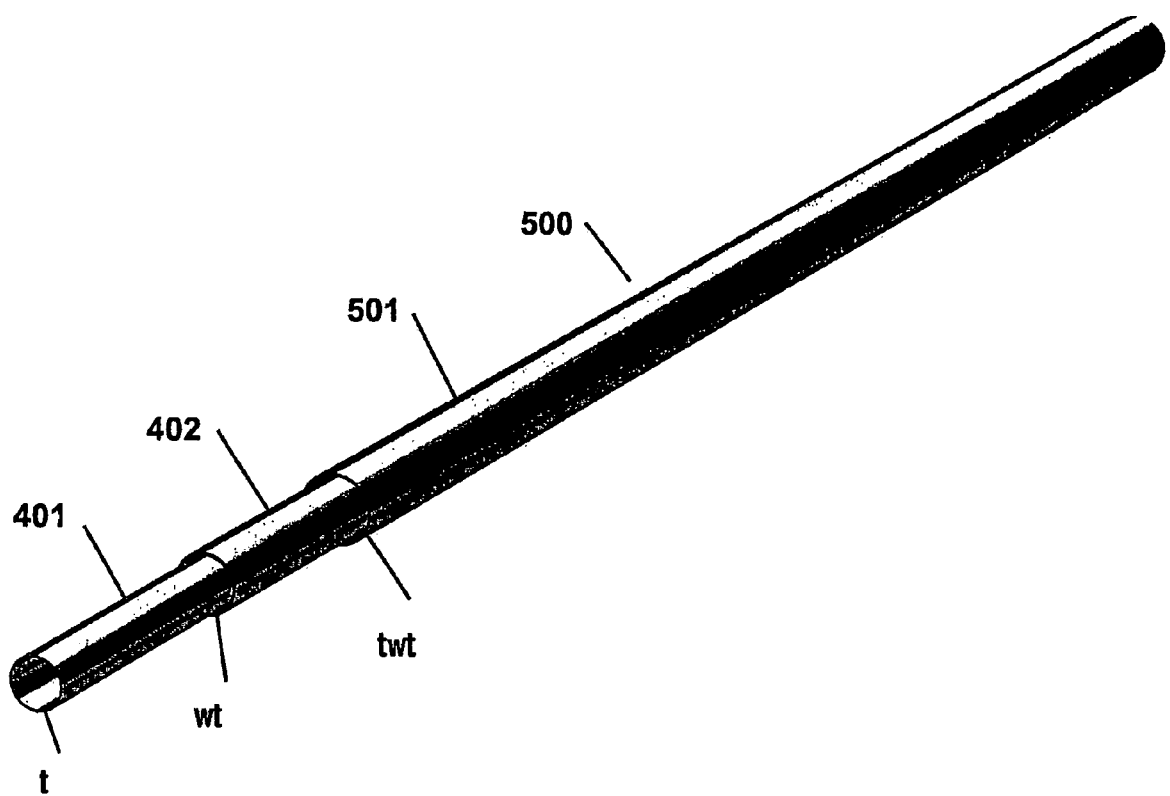
FIG. 5 a plan view of a multi-layered metal tubing according to an exemplary embodiment of the present invention.

FIG. 5 is a plan view of a multi-layered metal tubing 400 with a portion of the multiple layers of tube removed to show the layering of the tubing. Multi-layered metal tubing 500 is formed similarly to the multi-layered tube in FIG. 4, but having yet another layer, 501, having a wall thickness twt. The tubing includes multiple metal tubes of different diameters which are embedded within one another in order from smallest diameter to largest diameter. As noted above, the tubes may or may not have substantially similar thicknesses, and they may or may not be composed of the same metals.

Figure 1:
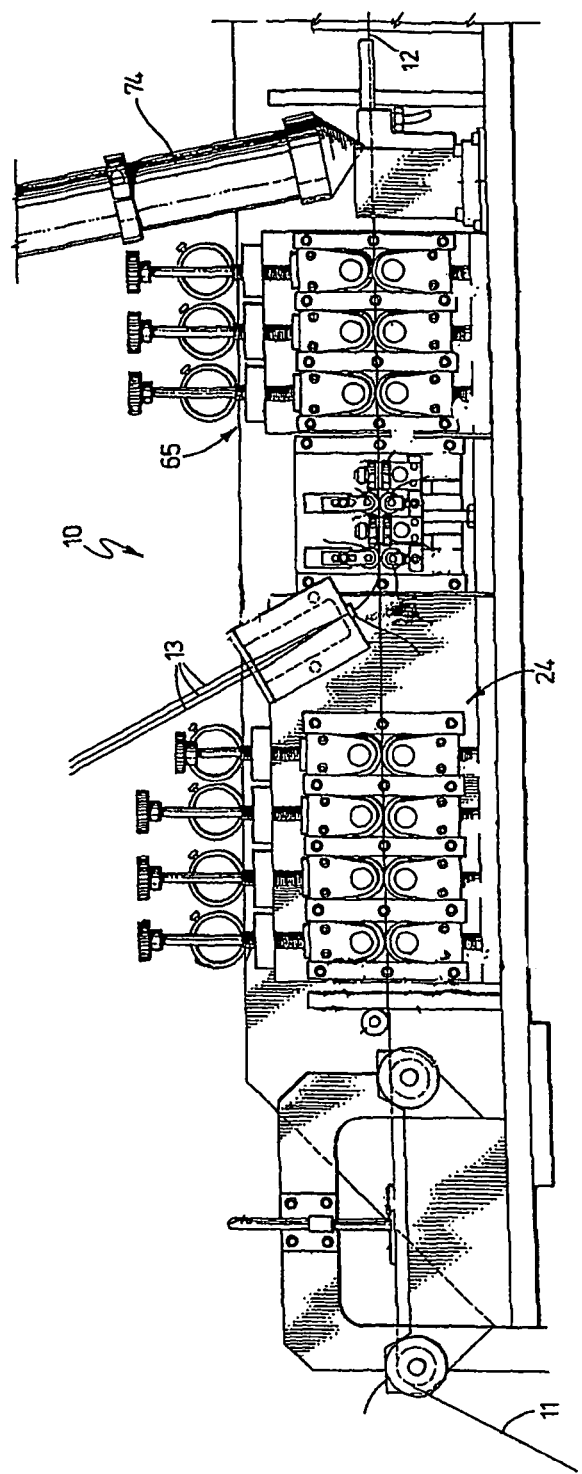
FIG. 1 is an elevation view of a first part of a conventional machine used to create metal tubing.
Figure 2:
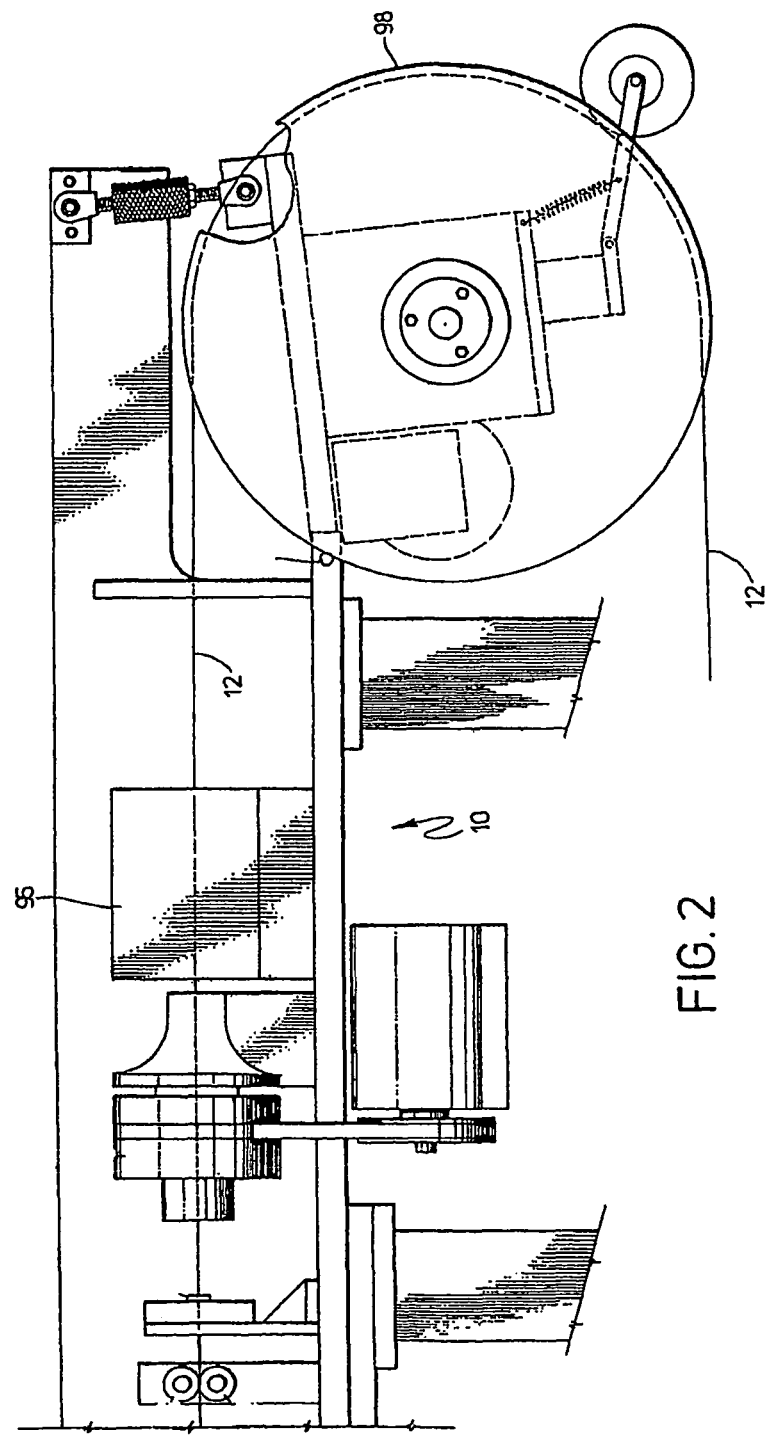
FIG. 2 is an elevation view of a second part of a conventional machine used to create metal tubing.
Figure 3:
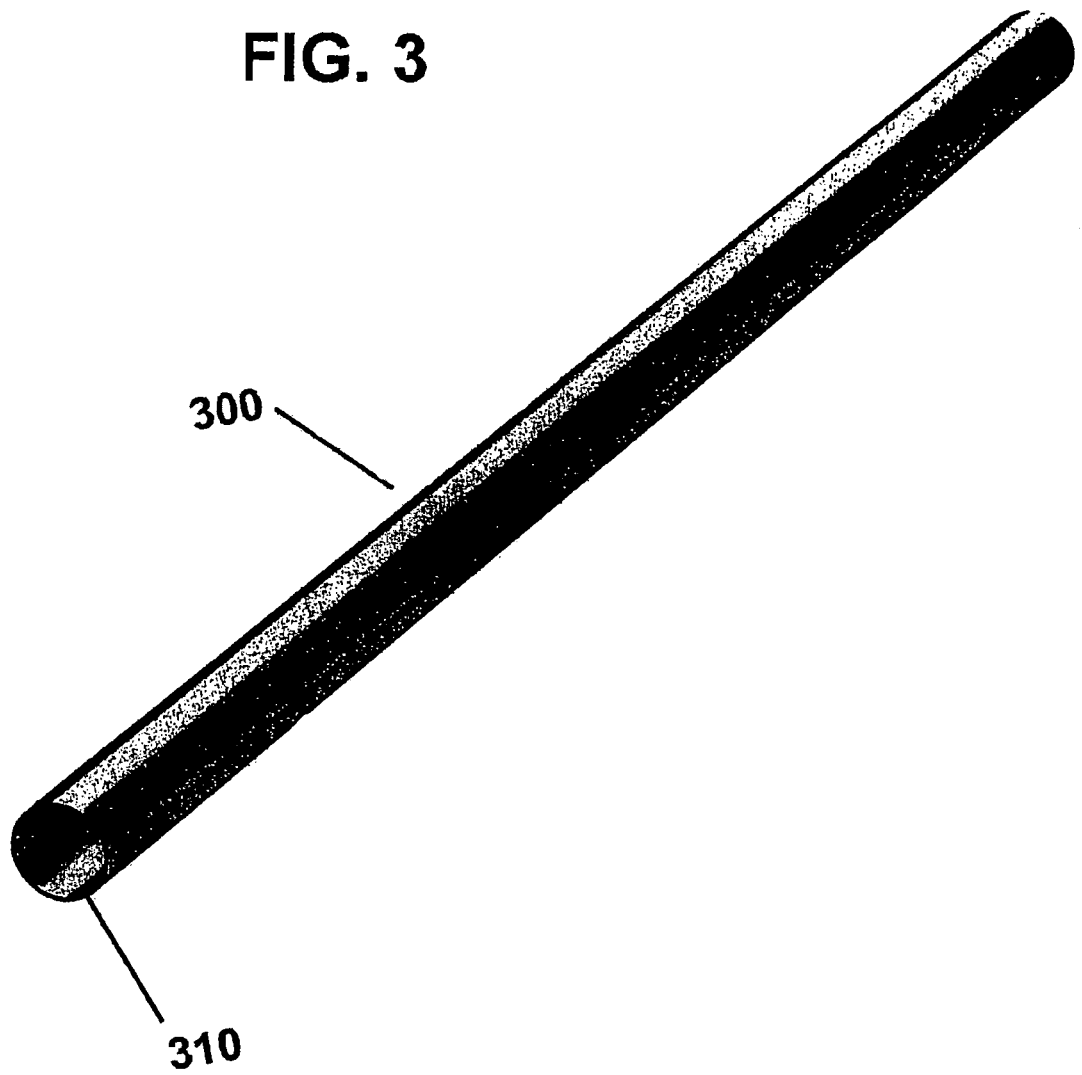
FIG. 3 is a plan view of a conventional single-layered metal tubing.

FIG. 6 shows a flowchart for creation of the multi-layered metal tubing using the apparatus shown in FIGS. 1 and 2. The method for creating the metal tubing according to an exemplary embodiment of the present invention includes creating a first metal tube, creating a second metal tube, and embedding the first metal tube into the second metal tube. The finished tubing is then coiled onto a reel.

The first tube 401 is created by forming a metal strip into the shape of a tube using a series of rollers S601. The tube shaped metal strip is then closed by pulling the tube shaped metal strip through a welding apparatus, which fuses the seam together S603. In the present exemplary embodiment, the welding apparatus uses a laser, however, any other process known by those skilled in the art for sealing the seam may be used, such as MIG (metal inert gas), plasma arc, induction, etc.

After the metal tube is formed, but before the tube is pulled through the welding apparatus, optical fibers, coated copper conductors, or any products requested for an application may be inserted into the metal tubing S602. Alternatively, the tubing may be left empty.

After the welding process, the welded tube can go through a drawing operation which reduces the diameter of the first tube to the desired size S604.

The second tube 402 is formed in a similar manner to the first tube. The second tube 402 is created by forming a metal tube from a metal strip by passing the metal strip through a series of rollers S605. The first tube 401, is embedded within the second tube S606. The second tube 402 is then pulled through the welding apparatus, which fuses the seam of the second tube 402 S607 and creates a multi-layered tubing 400. Should either the first tube or the second tube have minor flaws in the weld area, a failure in one of the tubes will not result in damaged product, as the other tube will still be intact.

Next, the multi-layered tube 400 goes through a drawing operation which reduces the diameter of the second tube 402 such that the inner diameter is brought into intimate contact (i.e. a compression fit) with the outer diameter of the first tube 401 S608. The portion of the machine which provides the motive force to pull the tube through the drawing die can easily perform this task as it normally does, whereas, the drive/motor may not be capable if it had to pull a single tube with twice the normal wall thickness. The multi-layered tube is then coiled on a reel S609.

Further tube layers may be created added by repeating the steps S605-608 and continuing to embed the previous multi-layer tube 400 within the newly created tube S610. If no further layers are needed, the finished multi-layered tube 400 may be coiled on a reel S611.

Because the welding apparatus only must fuse the thickness of the second tube, the welding apparatus performs the fusing of the tube, and does not require the power that is needed when attempting to fuse a tube having a wall thickness equal to that of the first tube and second tube combined.

The amount of compression of the second tube determines how the first and second tube of the combined tube interact with each other. The tighter the compression between the first and second tubes, the more the two tubes will act like a single walled tube with a wall thickness equal to that of the wall thicknesses of the two individual tubes. However, an upper limit of compression exists because as the compression is increased, the force required to pull the composite tubes through the dies or roll reduce the tubes can be such that the equipment may not accomplish the compression because the force is such that the tube exceeds its tensile strength and separates or breaks.

Although the exemplary embodiment of the present invention has been described, it will be understood by those skilled in the art that the present invention should not be limited to the described exemplary embodiment, but various changes and modifications can be made within the spirit and the scope of the present invention. Accordingly, the scope of the present invention is not limited to the described range of the following claims.

What is claimed is:

1. A metallic tube comprising:
a first cylindrical member, with an outer surface, which is formed from a first flat metal strip of a first specified thickness and has a welded seam;
and a second cylindrical member, with an inner surface, which is formed from a second flat metal strip of a second specified thickness and has a welded seam;
wherein the entire outer surface of the first cylindrical member is in direct contact with the entire inner surface of the second cylindrical member;
wherein a wall thickness of each of the first and second cylindrical members is between 0.004 in. and 0.013 in, and
wherein a resultant outer diameter of the second cylindrical member is less than or equal to ¼ in.

2. The metallic tube as claimed in claim 1, wherein a thickness of the first cylindrical member and a thickness of the second cylindrical member are substantially similar.

3. The metallic tube as claimed in claim 1, wherein a thickness of the first cylindrical member is different from a thickness of the second cylindrical member.

4. The metallic tube as claimed in claim 1, wherein the first cylindrical member and the second cylindrical member comprise different metals.

5. The metallic tube as claimed in claim 1, wherein the first cylindrical member and the second cylindrical member comprise the same metal.

6. The protective metallic tube as claimed in claim 1, wherein a resultant outer diameter of the second cylindrical member is less than or equal to 3/16 in.

7. A method for creating a metallic tube comprising:
forming a first cylindrical member, with an outer surface, from a first flat metal strip of a first specified thickness and welding a seam to close said first cylindrical member;
forming a second cylindrical member, with an inner surface, from a second flat metal strip of a second specified thickness and welding a seam to close said second cylindrical member; and
embedding said first cylindrical member into said second cylindrical member;
wherein the entire outer surface of the first cylindrical member is brought into direct contact with the entire inner surface of the second cylindrical member through a drawing operation;
wherein a wall thickness of each of the first and second cylindrical members is between 0.004 in. and 0.013 in., and
wherein a resultant outer diameter of the second cylindrical member is less than or equal to ¼ in.

8. The method for creating a metallic tube as claimed in claim 7, wherein a thickness of the first flat metal strip and a thickness of the second flat metal strip are substantially similar.

9. The method for creating a metallic tube as claimed in claim 7, wherein a thickness of the first flat metal strip and a thickness of the second flat metal strip are different.

10. The method for creating a metallic tube as claimed in claim 7, wherein the first cylindrical member and the second cylindrical member are different metals.

11. The method for creating a metallic tube as claimed in claim 7, wherein the first cylindrical member and the second cylindrical member are the same metal.

12. The method for creating a protective metallic tube as claimed in claim 7, wherein a resultant outer diameter of the second cylindrical member is less than or equal to 3/16 in.

13. A method for creating a metallic tube product comprising:
forming a plurality of cylindrical members having different diameters from a plurality of flat metal strips and welding a seam of each of the cylindrical members to close each of the cylindrical members; and
forming a layered metallic tube by embedding the plurality of cylindrical members within each other in order from the smallest diameter to the largest diameter;
wherein the embedded cylindrical members are brought into direct contact through a drawing operation,
wherein a wall thickness of each of the plurality of cylindrical members is between 0.004 in. and 0.013 in., and
wherein a resultant outer diameter of the embedded cylindrical members is less than or equal to ¼ in.

14. The method of making a metallic tube product according to claim 13, wherein at least two of the plurality of cylindrical members comprise different metals; and at least two of the plurality of flat metal strips have different thicknesses.

15. The method of making a metallic tube product according to claim 13, wherein each of the plurality of cylindrical members comprise the same metal.

16. The method of making a metallic tube product according to claim 13, wherein the plurality of flat metal strips have a substantially similar thickness.

17. The method of making a protective metallic tube product according to claim 13, a resultant outer diameter of the embedded cylindrical members is less than or equal to 3/16 in.

* * * * *